Jan. 2, 1968

E. D. HONDROULIS 3,361,055

BARBECUE SPIT MACHINE

Filed Dec. 12, 1966

INVENTOR
EMMANUEL D. HONDROULIS

BY Semmes & Semmes

ATTORNEYS

Jan. 2, 1968     E. D. HONDROULIS     3,361,055
BARBECUE SPIT MACHINE

Filed Dec. 12, 1966     3 Sheets-Sheet 2

INVENTOR
EMMANUEL D. HONDROULIS

BY Semmes & Semmes
ATTORNEYS

Jan. 2, 1968  E. D. HONDROULIS  3,361,055
BARBECUE SPIT MACHINE

Filed Dec. 12, 1966  3 Sheets-Sheet 3

INVENTOR
EMMANUEL D. HONDROULIS

BY Semmes & Semmes
ATTORNEYS

United States Patent Office 3,361,055
Patented Jan. 2, 1968

3,361,055
BARBECUE SPIT MACHINE
Emmanuel D. Hondroulis, 402 Walpole Court,
Valley Crest, Timonium, Md. 21093
Filed Dec. 12, 1966, Ser. No. 600,930
1 Claim. (Cl. 99—421)

ABSTRACT OF THE DISCLOSURE

A barbecue spit machine of the type having a base supporting a fire box and a spit driving means and a barbecue hood supported upon the base. Pairs of notched barbecue spit supports extend vertically within the hood and have a rotatable worm drive gear. A plurality of barbecue spits is supported horizontally in the notches of the spit support so as to engage the worm at one end and so as to be blocked horizontally at their other ends in the notches of the spit supports.

Background of the invention (1) *Field of the invention.*—Foods and beverages, cooking apparatus, spit or impaling type, movably or adjustably supported.

(2) *Description of the prior art.*—The prior art has been variously directed to means for rotatably driving a plurality of horizontally supported spits in a barbecue oven. For the most part, these devices have been complex mechanically and have involved chain drive or rotary gear mechanisms which were complex and deleteriously affected by the heat. None of the prior art references has disclosed a portable barbecue oven having a worm driven barbecue spit of the present type engageable with a vertically disposed worm gear at one end and lockable horizontally within the barbecue spit support notch at its other end. In the prior art, the tendency of the worm drive was to push the spit horizontally out of engagement with the drive.

Summary of the invention

The present invention provides a sturdy, portable worm driven barbecuing device, insuring positive locking of the spits in the barbecue supports and enabling the use of a small device for the serving of a large amount of people. Any one spit is readily removable, while the others are in motion.

Description of the preferred embodiments

Figure 1:
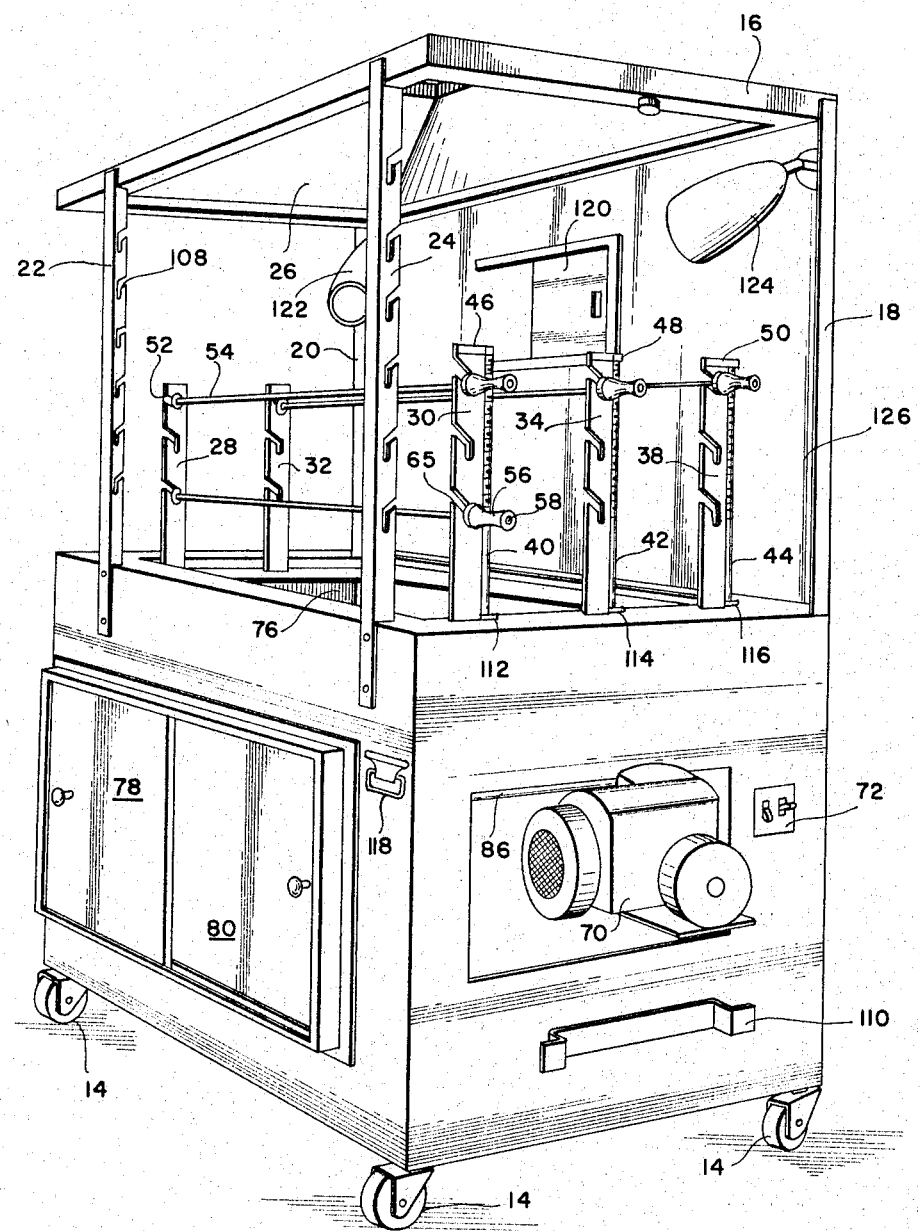
FIG. 1 is a perspective view of applicant's barbecue spit machine.
Figure 2:
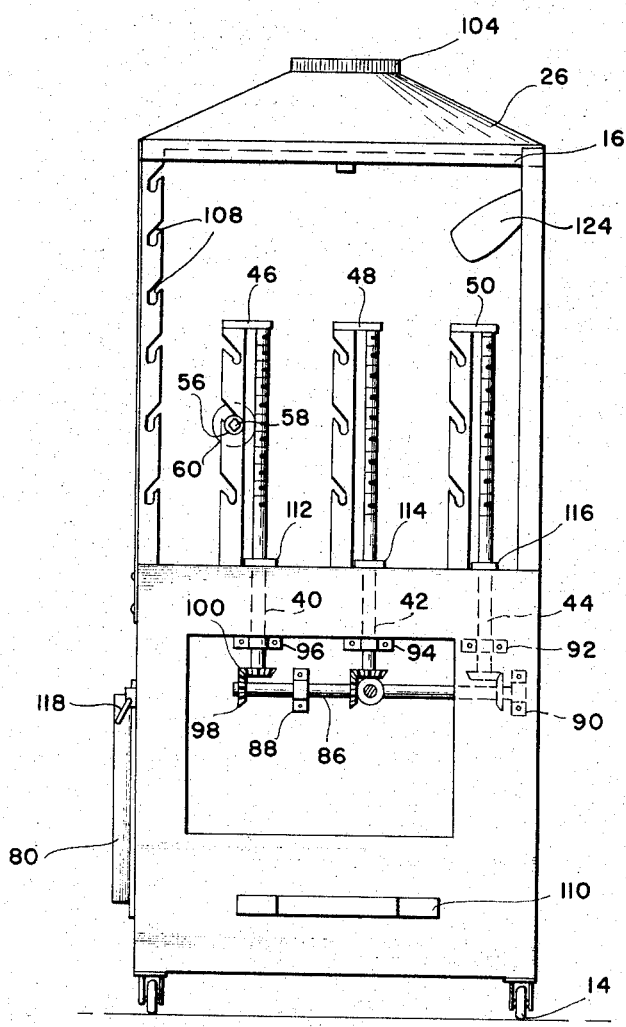
FIG. 2 is an end elevation.

In FIG. 1 a barbecue spit machine generally designated as 10 is illustrated as including base portion 12 mounted upon casters 14 and a hooded portion 16 supported upon vertical rear supports 18 and 20 and vertical front supports 22 and 24, these latter having notches 108 for parking support of barbecue spits not being rotated above the fire. Supported within the base and vertically extending within the hood portion are pairs of notched barbecue spit supports 28 and 30, 32 and 34, and 36 and 38, each having special notches 52 for engagement with the spit shank. Vertically extending worms 40, 42 and 44 are secured by means of pillow blocks 46, 48 and 50, as well as bearings 112, 114 and 116 to engage barbecue spit worm gear 60. The worms 40, 42 and 44 are operatively connected to motor drive shaft 86 by miter gears. Shaft 86 is bearing mounted.

Each barbecue spit is comprised of shank portion 54 having its sharp edges rounded. A wooden or insulated handle 56 is secured to the spit by means of a threaded bolt 58.

As illustrated in FIG. 1, the barbecue spit is rotatably supported in the spit supports by means of the spit shank end resting in notch 52 while being horizontally locked through machine gear 64 engaging both sides of the spit support adjacent notch 52. At its handle end the spit is positioned in notches 54 both by machine gear 65, as well as by washers 63 so that spit worm 60 engages either of the vertically extending worms 40, 42 or 44.

Figure 3:
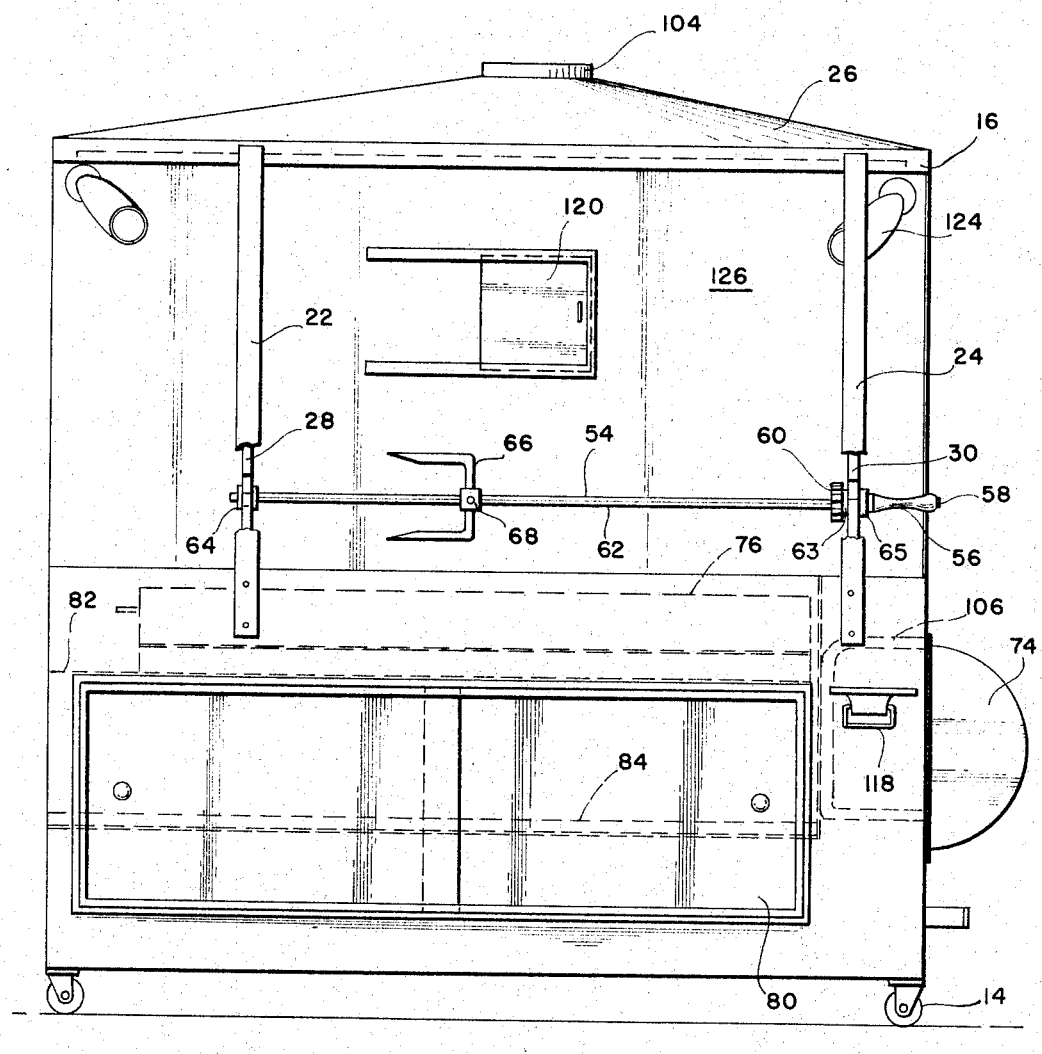
FIG. 3 is a front elevation.

A plurality of barbecue skewers 66, as illustrated in FIG. 3, may be fixed adjustably to the individual shafts 54 by set screws 68. Drive motor 70 supported outwardly by insulated baffle 106 is provided with a speed reducer so as to reduce the speed approximately from 1800 to 200 r.p.m. Main drive shaft 86 mounted in bearings 88 and 90 is provided with three miter gears 98, engaging corresponding miter gears 100 in the worm gear shafts 40, 42 and 44. These shafts in turn are mounted respectively in pillow blocks 92, 94 and 96. Worms 40, 42 and 44 turn at 200 r.p.m. driving the spit through worm gear 60 resulting in a 40 to 1 reduction and an ultimate rotating spit speed of 5 r.p.m. Operation of the drive motor and illuminating lamps 122 and 124 may be controlled by switch panel 72. A removable fire box 76 containing the charcoal or like material is supported beneath the spits, and is horizontally removable from the end of the base opposite motor 70. Sliding doors 78 and 80 may be provided for accessibility to the base interior, including fire baffle 82 and drip pan 84. Fire baffle 82 is provided as a modicum of protection intermediate the fire box 76 and the miter gear driving mechanism which is required to be oiled. Drip pan 84 is provided to collect grease which is not consumed within the fire box 84. Vent 104 may be provided in hood 26 and, also, sliding doors 120 may be provided in the hood rear reflecting plate 126. Bracket 110 may be mounted on the housing side so as to contain the electric motor wire cord. Handle 118 may be bracket mounted on the housing front as an assistance in wheeling the barbecue spit machine from one place to another.

According to this invention, hams, large sections of beef, whole lambs and the like may be cooked simultaneously and uniformly by supporting them at various distances from the fire box unit. As cooking of one item is completed it may be transferred to the top skewer farthest from the fire box or to the notches 108 in the front supports 22 and 24, either to decrease the cooking rate or to keep the food warm while waiting for it to be served. As a result, large groups of people can be fed simultaneously by a single chef.

Manifestly, the housing and hood may be variously configured without departing from the scope of invention, as defined in the claims.

I claim:
1. A barbecue spit machine of the type used for roasting and comprising:
  (a) a base portion enclosing a fire box and a barbecue spit drive means;
  (b) a hood portion supported upon said base so as to define a barbecue roasting area said hood portion including:
    (i) a pair of front channel elements mounted in said base and extending to said hood and being notched for the stationary parking support of spits; and
    (ii) a pair of rear channel elements mounted in said base and extending to said hood, said rear channel elements supporting a reflector plate;
  (c) a plurality pairs of notched barbecue spit supports fitted in said base independently of said channel ele- ments and extending vertically into said barbecue roasting area, at least one support of each said pair rotatably supporting a vertically extending worm connected within said base to said spit drive means; and (d) at least one barbecue spit, having a rotary drive gear engageable with said worm at one end and rotatably supported in said pairs of notched supports so that said drive gear engages said worm at one end, and said spit having at its other end a machined ring engageable with the notches of said barbecue spit supports.

References Cited

UNITED STATES PATENTS

| | | | |
|---|---|---|---|
| 1,442,584 | 1/1923 | Schey | 99—421 |
| 1,702,900 | 2/1929 | Humphrey | 99—421 |
| 1,723,145 | 8/1929 | Fernald | 99—421 |
| 2,379,239 | 6/1945 | Krebs | 99—421 |
| 2,399,163 | 4/1946 | Brunamonti | 99—421 |
| 2,588,046 | 3/1952 | Ridgely | 99—421 |
| 2,600,760 | 6/1952 | Guffey | 99—421 X |
| 2,608,190 | 8/1952 | Winning et al. | |
| 2,618,730 | 11/1952 | Panken | 99—421 X |
| 2,701,516 | 2/1955 | Dorsey | 99—421 X |
| 2,763,200 | 9/1956 | Kittler | 99—421 X |
| 2,815,707 | 12/1957 | Morrow | 99—421 |
| 2,888,872 | 6/1959 | Bathe | 99—421 X |
| 3,190,211 | 6/1965 | Ticoian | 99—421 |

FOREIGN PATENTS 164,728   1/1934   Switzerland.

WALTER A. SCHEEL, *Primary Examiner.*

J. M. NEARY, *Assistant Examiner.*